Aug. 11, 1953   G. T. GIBSON ET AL   2,648,452
GARBAGE VEHICLE
Filed April 19, 1951   5 Sheets-Sheet 1

Inventors
GEORGE THOMSON GIBSON
WILLIAM H.W. RAMSAY
By
Attorney

Aug. 11, 1953 G. T. GIBSON ET AL 2,648,452
GARBAGE VEHICLE
Filed April 19, 1951 5 Sheets-Sheet 2

Inventors
GEORGE THOMSON GIBSON
WILLIAM H. W. RAMSAY
By Francis E. Boyle
Attorney

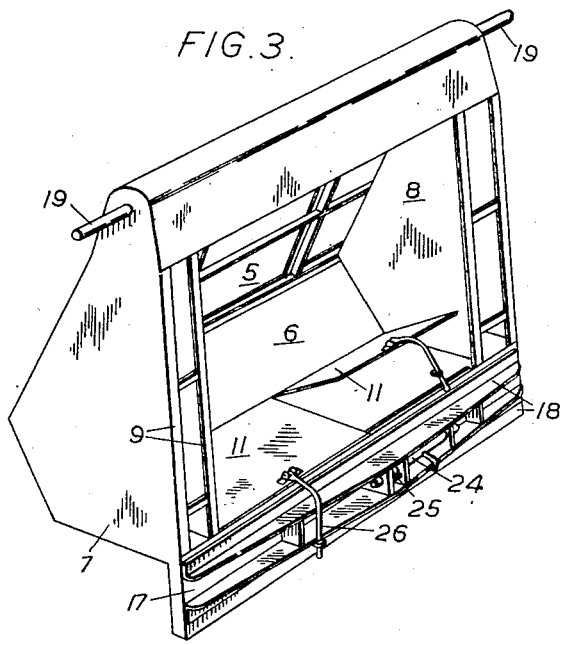
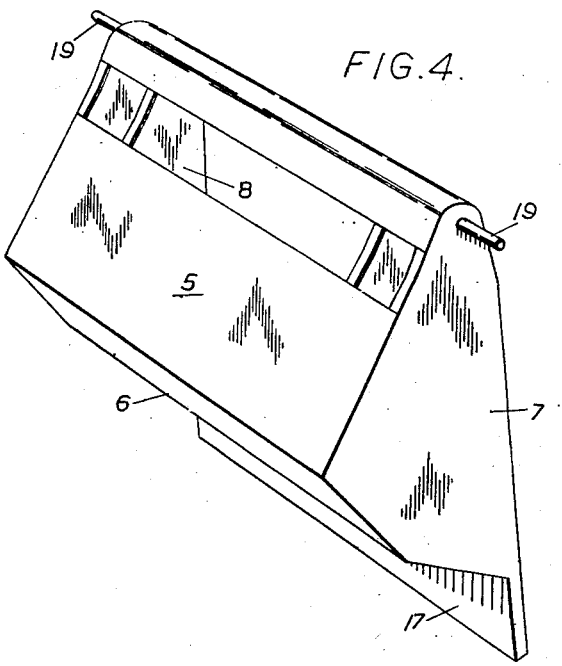

Aug. 11, 1953 G. T. GIBSON ET AL 2,648,452
GARBAGE VEHICLE
Filed April 19, 1951 5 Sheets-Sheet 4

INVENTORS:
GEORGE T. GIBSON
WILLIAM H. W. RAMSAY,

BY: Francis E Boyce
ATTORNEY

Aug. 11, 1953   G. T. GIBSON ET AL   2,648,452
GARBAGE VEHICLE
Filed April 19, 1951   5 Sheets-Sheet 5

INVENTORS:
GEORGE T. GIBSON
WILLIAM H. W. RAMSAY,
BY: Francis E Boyce
ATTORNEY

Patented Aug. 11, 1953

2,648,452

UNITED STATES PATENT OFFICE 2,648,452

GARBAGE VEHICLE

George Thomson Gibson, Edinburgh, and William H. W. Ramsay, Penicuik, Scotland, assignors to John Gibson & Son Limited, Edinburgh, Scotland Application April 19, 1951, Serial No. 221,764
In Great Britain September 12, 1950

5 Claims. (Cl. 214—503)

This invention relates to garbage-collecting vehicles of the kind in which the vehicle body is adapted to be tipped to discharge the garbage through a door through which the garbage is introduced into the vehicle.

The object of the present invention is to provide an improved construction of door through which the garbage can be introduced into an auxiliary compartment, the garbage in the auxiliary compartment being discharged therefrom into the body of the vehicle in such a manner that emission of dust and dirt is avoided.

According to the present invention the door of the vehicle body is constituted by a pendulously suspended door structure closed on three sides and at the bottom by an inner wall and by side and bottom walls to form a cavity which is open to the outside of the vehicle in order to enable the garbage to be fed through one or more openings in the bottom wall of said door structure into a charging chamber beneath said bottom wall, the floor of said charging chamber being curved upwards towards an opening into the interior of the vehicle body, the inner wall of said door structure being adapted to swing through said opening and said door structure being provided with a depending barrier, scraper or push plate beneath its open outer side, the said barrier, scraper or push plate being adapted to close the said charging chamber from the outside and to sweep over said curved floor, when the door structure is swung inwards.

The openings in the bottom wall of the cavity of the door structure are preferably fitted with removable, hinged or self-closing covers to avoid the emission of dust from the charging chamber, particularly when the door structure is swung inwards to sweep the garbage from the charging chamber into the interior of the vehicle.

According to a further feature of the invention, the inner wall of the door structure has a lower section inclined inwards and upwards and an upper section, preferably oppositely inclined. The lower edge of the lower section adjoins the bottom wall of the door structure and when feeding garbage into the charging chamber the latter is wholly or substantially sealed on the outside. Moreover, the lower section of the inner wall of the door structure compresses, compacts or crushes any garbage when the door structure is swung inwards into the vehicle and pushes the garbage into the vehicle.

According to a further feature of the invention, the door structure is adapted to be oscillated by power means, preferably by means of a hydraulic or other fluid-pressure-operated ram, and means are provided for disconnecting the door structure from its oscillating means to enable the door structure to swing outwards automatically under its own weight and clear of the arcuate floor when the vehicle body is tipped to discharge the garbage therefrom.

The door structure may be pendulously supported at its upper end on trunnions carried by the vehicle body, either at the rear end of the vehicle when the latter has a rear opening, or at the side of the vehicle if the vehicle is adapted to be charged through a side opening.

The invention will be readily understood by reference to the accompanying drawings which illustrate a preferred manner of carrying out the invention.

In the drawings

Figs. 3 and 4 are perspective views of the door structure as seen from outside and inside respectively.

Figure 1:
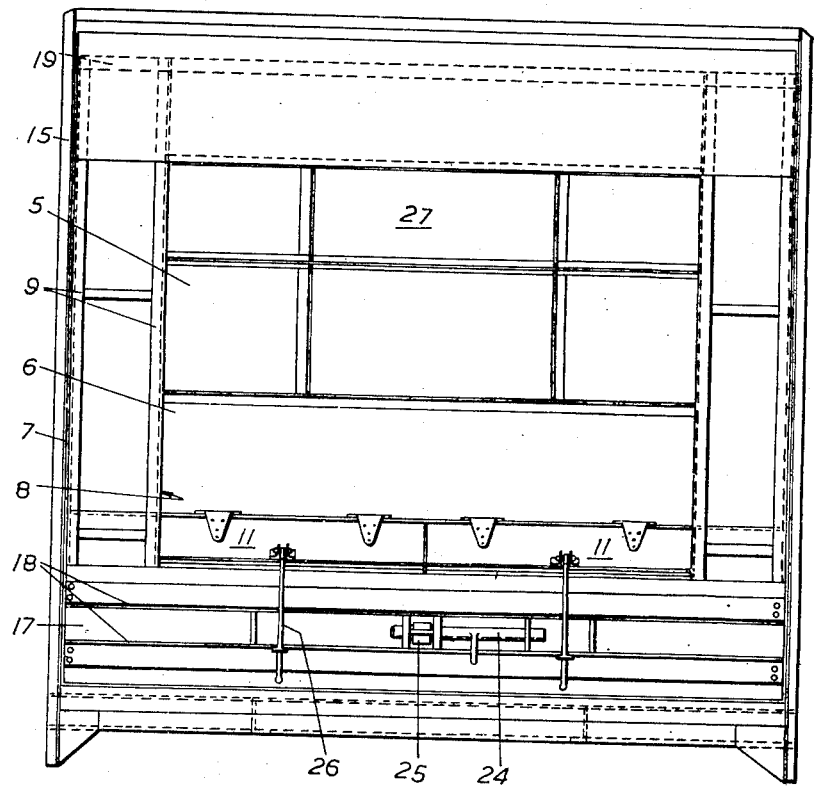
Fig. 1 is an end view of the garbage vehicle body.
Figure 2:
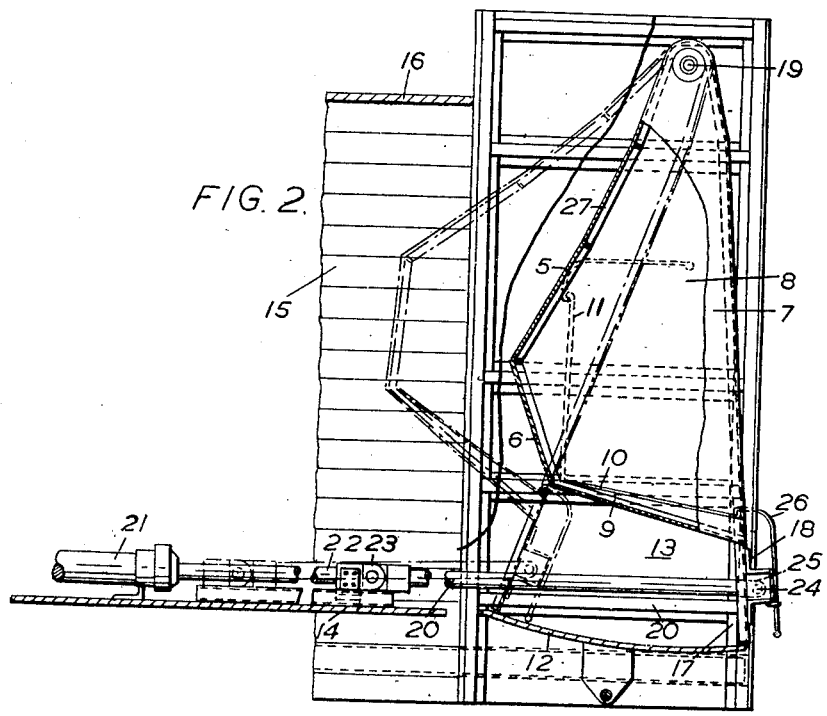
Fig. 2 is a fragmentary longitudinal sectional view of the rear end of the vehicle body showing the door structure in normal position in full lines and in its innermost position in broken lines.
Figure 5:
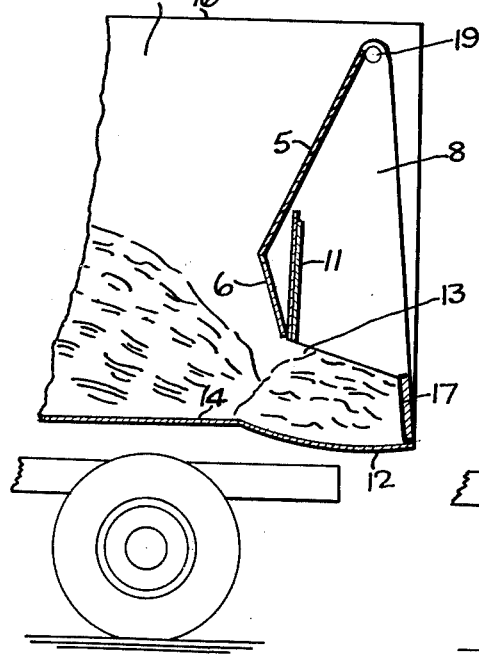
Fig. 5 is a diagrammatic vertical section of the rear end of a vehicle body showing the door structure in the loading position.

The door structure comprises oppositely inclined upper and lower wall sections 5 and 6 extending between and connecting the inner or forward edges of a pair of spaced vertical outer side plates 7. Each of the outer side plates is connected to and spaced from an inner vertical side plate 8, the space between each pair of side plates 7 and 8 being braced to give the necessary rigidity to the structure. The side plates are shaped as shown and are secured to correspondingly shaped frame members indicated by the general reference character 9 and the side plates 7 and wall sections 5 and 6 together form a cavity open at the rear and closed below by a platform 10 conveniently composed of a pair of hinged lid sections 11. The platform constituted by the lid sections 11 is spaced above the curved floor 12 of a charging chamber 13, the floor 12 being curved upwards towards and merging into the main floor 14 of the vehicle body which has closed sides 15 and a roof 16. The charging chamber 13 is thus open at the front to the interior of the vehicle, but it is closed at the rear by a depending barrier, scraper or push plate 17 which may be stiffened by means of stiffeners 18. The door structure is arranged to be pendulously supported in the rear of the vehicle body, being hung by means of trunnions 19 in suitable bearings in the upper part of the vehicle so that the push plate 17 sweeps over the curved floor 12. In the position shown in full lines in Fig. 2 and in Fig. 6, the door structure virtually closes the rear of the vehicle body and the charging chamber 13 is accessible through the hinged lid sections 11 when the latter are raised (Fig. 5).

A ram rod 20 is adapted to be displaced longitudinally by power means, preferably by means of a hydraulic or other fluid-pressure-operated ram cylinder 21, the piston rod 22 of which is coupled to the ram rod 20 by means of a hinged and slidably-guided coupling 23 to permit the ram rod 20 to rise and fall at its outer end during reciprocation so that it may follow swinging movement of the door structure to which it is detachably coupled by means of a slidable locking device 24 on the door structure engaging an eye 25 on the ram rod.

Figure 6:
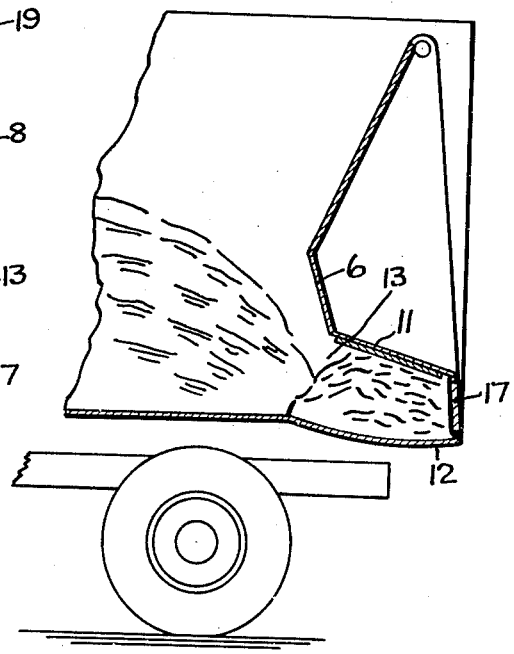
Fig. 6 is a view similar to Fig. 5 showing the lid sections closed after loading.
Figure 9:
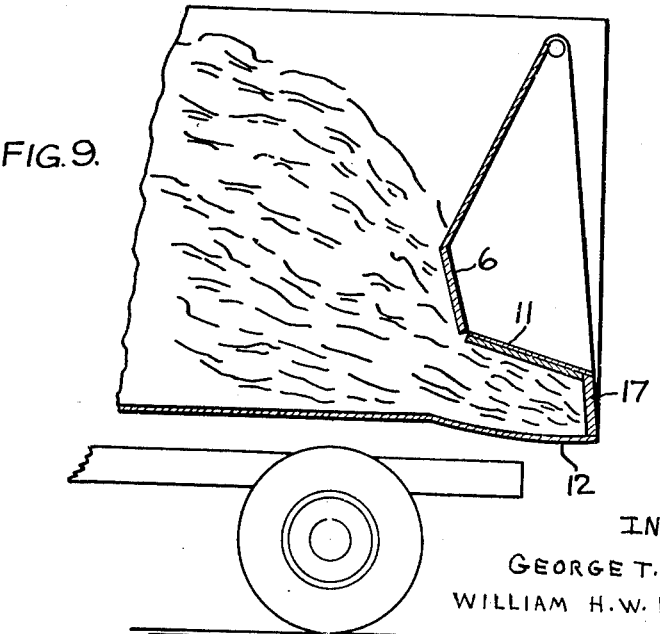
Fig. 9 shows the door structure returned to its normal position and the vehicle body filled.
Figure 7:
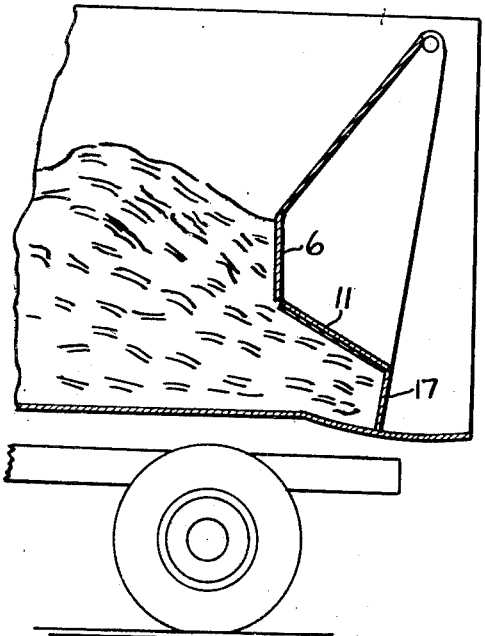
Fig. 7 is a similar view showing the door structure during its inward movement.
Figure 8:
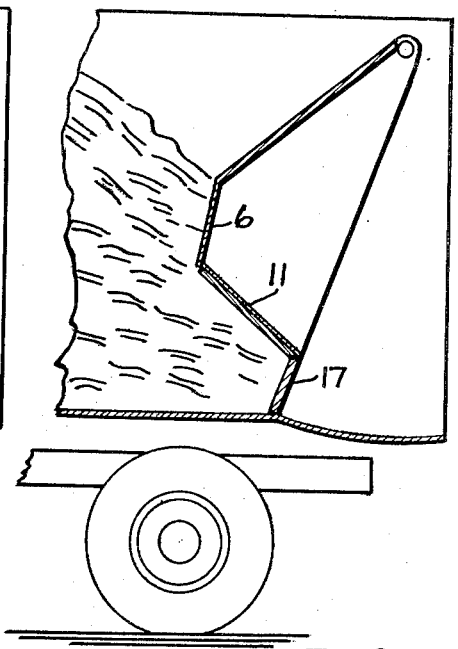
Fig. 8 shows the door structure at the end of its inward movement.

In operating the apparatus of the present invention, the loading of the vehicle is effected while the door structure is locked by the bolt 24 and ram rod 20 against movement. In this position the lid sections 11 are opened as shown in Fig. 5 and in broken lines in Fig. 2 and the garbage is deposited into the charging chamber 13 until the latter is full. Thereupon the lid sections are closed (Fig. 6) and locked in the closed position, as by means of hinged locking bars 26. The ram rod 20 is then operated to draw the push plate 17 forwards, thus swinging the door structure inwards and sweeping the garbage along the curved floor 12 and into the interior of the vehicle. During the initial inward movement of the door structure, as shown in Fig. 7, the push plate 17 pushes the garbage forward and the material piles up in front of the push plate. Eventually, as the pile increases, the wall section 6 of the door structure comes into operation and assists in pushing the upper part of the pile of material into the vehicle, until the door structure finally assumes the position shown in Fig. 8 and in broken lines in Fig. 2, whereupon movement of the ram rod 20 is reversed and the door structure is returned to its initial position (Fig. 6).

An inspection opening 27 (Fig. 2) may be provided above the upper wall section 5 of the door structure to enable conditions of loading to be observed.

More garbage can then be loaded into the vehicle by opening the lid sections 11 and repeating the cycle of operations shown in Figs. 5–9, the push plate 17 compressing the new charge, and the wall section 6 pressing the upper layer of material into the interior of the vehicle.

Figure 10:
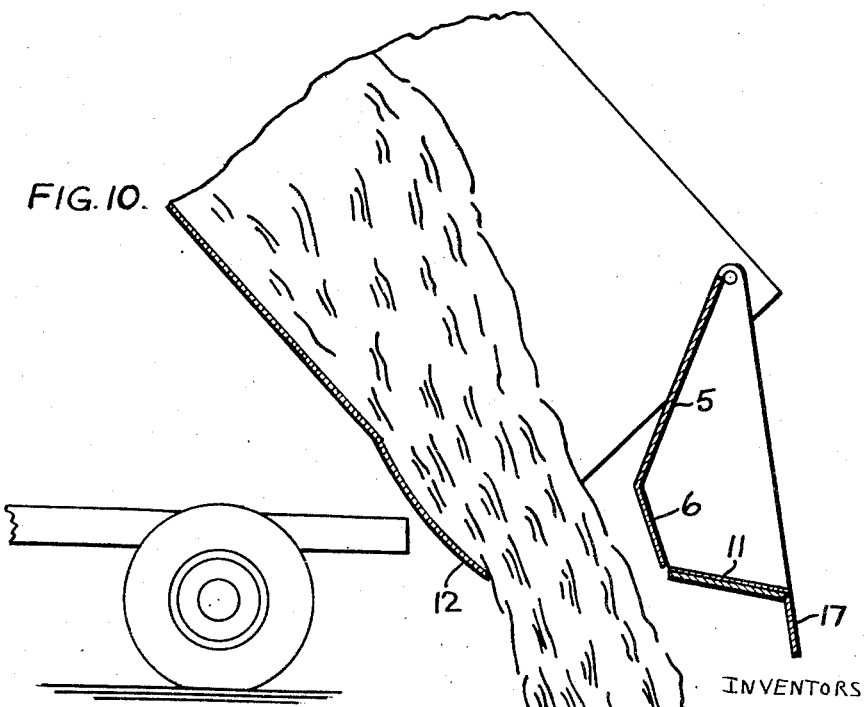
Fig. 10 is a diagrammatic sectional view showing the vehicle body in tipped position and the material being discharged through the rear opening formed by the outward swinging movement of the door structure.

In order to unload the vehicle, which is of the known rearwardly tipping type, the locking bolt 24 is withdrawn and the vehicle tipped as shown in Fig. 10. As the front of the vehicle body rises, the door structure 5, 6, 11, 17 swings outwards under its own weight and the contents of the vehicle are discharged over the rear edge of the curved floor 12.

We claim:

1. A garbage vehicle comprising a vehicle body having closed sides, a roof therefor, and a floor, a housing at the rear end of said vehicle body, said housing having an arcuate floor meeting the vehicle body floor at its inner end, a door structure pendulously suspended in said housing for swinging movement towards and away from the vehicle body, a chamber formed in the outer side of said door structure by a bottom wall spaced from said arcuate floor and inclined upwards towards the vehicle body and by an inner wall inclined upwards from the inner edge of said bottom wall and side walls between which said bottom wall and inner wall extend, and said bottom wall including hinged lid sections, and a push-plate depending from the outer edge of said bottom wall and normally closing the space between said bottom wall and the arcuate floor, said push-plate moving in close proximity to said arcuate floor when said door structure is swung inwards.

2. A garbage vehicle according to claim 1 including reciprocatory means detachably connected to the push-plate and passing through the space beneath said bottom wall into the interior of the vehicle body above the floor thereof, operating means operatively connected to said reciprocatory means, and locking devices for releasably locking said lid sections in closed position.

3. A garbage vehicle having a rearwardly tipping body the floor of which terminates at its rear end in an arcuate section curved downwards and outwards and a pendulously suspended structure closing the rear end of said body, said structure including covers for a substantially horizontal charging opening spaced from and above the arcuate floor section and providing a charging space beneath said covers, and said structure including a downwardly depending push member at the rear edge of said charging opening and an upwardly extending wall at the front edge of said charging opening, and means for oscillating said structure to cause said push member to sweep across the arcuate floor section and to push material thereon into the vehicle body, and simultaneously to cause said wall to push the upper layer of material into the interior of the vehicle body.

4. A garbage vehicle as specified in claim 3 including power-actuating means for oscillating said structure, and means for disconnecting said power-actuated means from said structure to enable the latter to swing outwards under its own weight when the vehicle body is tipped, so that said push-member moves away from the outer edge of said arcuate floor section.

5. A garbage vehicle as specified in claim 3 including power-actuated means for oscillating said structure comprising a fluid-pressure-operated reciprocatory ram, a sliding crosshead connected to the said ram, a connecting rod attached to said crosshead, and releasable coupling means detachably connecting said connecting rod to a lower part of said structure.

GEORGE THOMSON GIBSON.
WILLIAM H. W. RAMSAY.

References Cited in the file of this patent

UNITED STATES PATENTS

| Number | Name | Date |
|---|---|---|
| 2,091,519 | Noyer | Aug. 31, 1937 |
| 2,212,058 | Wood | Aug. 20, 1940 |
| 2,263,199 | Wachter et al. | Nov. 18, 1941 |
| 2,323,366 | Barrett | July 6, 1943 |

FOREIGN PATENTS

| Number | Country | Date |
|---|---|---|
| 788,016 | France | July 22, 1935 |